United States Patent
Nonaka

(10) Patent No.: US 10,963,988 B2
(45) Date of Patent: Mar. 30, 2021

(54) IMAGE PROCESSING DEVICE, IMAGE PROCESSING SYSTEM, IMAGE PROCESSING METHOD, AND PROGRAM

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

(21) Appl. No.: 16/520,382

(22) Filed: Jul. 24, 2019

(65) Prior Publication Data

US 2020/0098090 A1 Mar. 26, 2020

(30) Foreign Application Priority Data

Sep. 25, 2018 (JP) ............................. JP2018-178970

(51) Int. Cl.
*G06T 3/40* (2006.01)
*G06T 7/90* (2017.01)

(52) U.S. Cl.
CPC .............. *G06T 3/4015* (2013.01); *G06T 7/90* (2017.01); *G06T 2207/10024* (2013.01)

(58) Field of Classification Search
CPC ............ G06T 3/4015; G06T 7/90; G06T 2207/10024; G06T 2207/20081; G06T 7/11; G06T 11/40; G06T 7/13; G06T 2207/20076; G06T 2207/20192; G06T 2207/20084; G06T 2207/30201

See application file for complete search history.

(56) References Cited

U.S. PATENT DOCUMENTS

| | | | |
|---|---|---|---|
| 6,785,329 B1 * | 8/2004 | Pan | G06K 9/342 375/240.08 |
| 2014/0003723 A1 * | 1/2014 | Lu | G06K 9/4604 382/182 |

(Continued)

FOREIGN PATENT DOCUMENTS

| | | | |
|---|---|---|---|
| CN | 110363720 A | * | 10/2019 |
| CN | 110717919 A | * | 1/2020 |

(Continued)

OTHER PUBLICATIONS

Line Creators Studio, online, URL: https://creator.line.me/en/studio/.

*Primary Examiner* — Charles T Shedrick
(74) *Attorney, Agent, or Firm* — Studebaker & Brackett PC

(57) ABSTRACT

An image processing device, an image processing system, an image processing method, and a program capable of suppressing unnaturalness of color of an object extracted from a color image are provided. An image processing device includes an object area determination unit that determines an object area, a mask image generation unit that generates a mask image, an object image generation unit that generates an object image on the basis of the object area, a color determination unit that determines a color to be subtracted from colors to be applied to the object area and sets a smaller number of colors than those of the object area as colors of the object image, and a probability calculation unit that calculates a probability of pixels of the mask image being pixels of the object area, and the object image generation unit sets the colors set using the color determination unit as colors of an edge area of the object image on the basis of the probability.

15 Claims, 8 Drawing Sheets

(56) References Cited

U.S. PATENT DOCUMENTS

| | | | |
|---|---|---|---|
| 2015/0063709 A1* | 3/2015 | Wang | G06T 7/174 |
| | | | 382/199 |
| 2017/0076142 A1* | 3/2017 | Chang | G06T 7/90 |
| 2018/0091788 A1* | 3/2018 | Lee | G09G 5/02 |
| 2019/0014884 A1* | 1/2019 | Fu | G06K 9/00281 |
| 2019/0019324 A1* | 1/2019 | Wu | G06T 11/001 |
| 2019/0073520 A1* | 3/2019 | Ayyar | G06K 9/42 |
| 2020/0020108 A1* | 1/2020 | Pao | G06T 7/194 |
| 2020/0098090 A1* | 3/2020 | Nonaka | G06T 7/90 |

FOREIGN PATENT DOCUMENTS

| | | | | |
|---|---|---|---|---|
| CN | 106846323 B | * | 7/2020 | |
| EP | 2500865 A2 | * | 9/2012 | G06T 7/11 |
| JP | 2013179402 A | * | 9/2013 | G06K 9/00536 |
| JP | 2014-071666 A | | 4/2014 | |
| JP | 2017-220098 A | | 12/2017 | |
| WO | WO-2005004040 A1 | * | 1/2005 | G06T 5/002 |
| WO | WO-2015129585 A1 | * | 9/2015 | G06T 7/12 |

\* cited by examiner

IMAGE PROCESSING DEVICE, IMAGE PROCESSING SYSTEM, IMAGE PROCESSING METHOD, AND PROGRAM

CROSS-REFERENCE TO RELATED APPLICATION

The present application claims priority under 35 U.S.C § 119 to Japanese Patent Application No. 2018-178970 filed on Sep. 25, 2018, which is hereby expressly incorporated by reference, in its entirety, into the present application.

BACKGROUND OF THE INVENTION

1. Field of the Invention

The present invention relates to an image processing device, an image processing system, an image processing method, and a program, and more particularly to area extraction of a color image.

2. Description of the Related Art

There is known a scheme of extracting an object from a color image such as a photograph. The object extracted from color images can be used for creation of a stamp or the like. "Line Creators Studio", Internet <URL: https://creator.line.me/en/studio/> describes a scheme of capturing an image captured using a smartphone from an album, designating a trimming range, extracting an object, and creating a stamp. However, in this scheme, it is necessary to directly designate a contour of an object, which takes time and effort. On the other hand, there is known a scheme of extracting a contour of an object from an image without directly designating the contour of the object using graph cutting and deep learning.

JP2014-071666A describes an image processing device that calculates an α value representing a degree of transparency on the basis of a probability of a pixel belonging to a foreground image, and multiplies the α value by a pixel value to extract a foreground image. Further, JP2017-220098A discloses generating a contour candidate probability field in which an infinitely small cost is given to pixels adjacent to each other on a contour line of a foreground area, and weighting an initial random field in the contour candidate probability field to generate a process probability field.

The image process device described in JP2017-220098A sets the processing probability field as a cost function, obtains a combination in which a cost in a case where a foreground or a background is labeled for all pixels of an original image is minimized, using graph cutting, separates the combination into a foreground and a background, and extracts the foreground area.

SUMMARY OF THE INVENTION

However, pixels belonging to an object extracted from an image and pixels belonging to a background are both present in a boundary between the object and the background. Then, color of the background or the like is mixed into the object at the boundary between the object and the background, and the color of the object becomes unnatural. Further, in an object extracted from a high definition color image, unnaturalness of colors of the object is remarkable.

JP2014-071666A, JP2017-220098A, and "Line Creators Studio", Internet <URL: https://creator.line.me/en/studio/> do not disclose a problem that the color of the object becomes unnatural and do not disclose a technology for solving the problem. That is, an object or the like extracted by applying the technology described in JP2014-071666A, JP2017-220098A, and "Line Creators Studio", Internet <URL: https://creator.line.me/en/studio/> may cause color unnaturalness.

The present invention has been made in view of such problems, and an object of the present invention is to provide an image processing device, an image processing system, an image processing method, and a program capable of suppressing unnaturalness of color of an object extracted from a color image.

The following invention aspects are provided in order to achieve the object.

An image processing device according to a first aspect is an image processing device comprising: an object area determination unit that determines an object area of a color image; a mask image generation unit that generates a mask image of the object area; an object image generation unit that extracts the object area and generates an object image on the basis of the object area; a color determination unit that determines a color to be subtracted from colors to be applied to the object area, and sets a smaller number of colors than those of the object area as colors of the object image; and a probability calculation unit that calculates a probability of pixels of the mask image being pixels of the object area, in which the object image generation unit sets the colors set using the color determination unit as colors of an edge area of the object image on the basis of the probability.

According to the first aspect, the color of the edge area of the object image corresponding to the boundary area of the mask image is set on the basis of the probability of being an object area, which has been set in the boundary area of the mask image. Accordingly, inclusion of colors of the background or the like into the object image can be suppressed.

The edge area of the object image includes pixels at an edge of the object image. The edge area of the object image may have a width of two or more pixels.

In a second aspect, in the image processing device according to the first aspect, the probability calculation unit may be configured to calculate the probability of a pixel in a boundary area in the mask image being the object area.

According to the second aspect, it is possible to reduce a processing load of computation, as compared with a case in which the probability of being an object area is applied to all pixels of the mask image.

According to a third aspect, the image processing device according to the first aspect or the second aspect may be configured to include a degree-of-transparency setting unit that sets a degree of transparency of the edge area of the object area on the basis of the probability; and a pixel integration unit that integrates pixels to which the degree of transparency has been applied into the object image.

According to the third aspect, an appropriate degree of transparency is set at the edge of the object image. Accordingly, occurrence of jaggies or the like at the edge of the object image is suppressed.

In a fourth aspect, in the image processing device according to any one of the first to third aspects, the color determination unit may be configured to set a color to be applied to the object image from colors to be applied to the object area.

In a fifth aspect, in the image processing device according to any one of the first to fourth aspects, the color determination unit may be configured to set a color to be applied to the object image from predetermined defined colors.

In a sixth aspect, in the image processing device of the fifth aspect, the color determination unit may be configured to set a color designated by a user from the defined colors as a color to be applied to the object image.

In the sixth aspect, a setting screen for setting a defined color may be displayed on a display device of a user terminal, and the user may designate the color to be applied to the object image using the setting screen.

In a seventh aspect, in the image processing device according to any one of the first to sixth aspects, the color determination unit may be configured to determine a color to be subtracted from the colors applied to the object area, using machine learning.

In an eighth aspect, is the image processing device according to any one of the first to seventh aspects, in a case where pixels of different colors are adjacent to each other in the object area, the object image generation unit may be configured to set an intermediate color between the different colors in the adjacent pixels of different colors.

According to the eighth aspect, it is possible to suppress unnaturalness between colors in the object image.

In a ninth aspect, in the image processing device according to any one of the first to eighth aspects, the object area determination unit may be configured to determine the object area on the basis of an area designated by a user.

In a tenth aspect, in the image processing device according to any one of the first to eighth aspects, the object area determination unit may be configured to determine the object area using machine learning.

In an eleventh aspect, in the image processing device according to any one of the first to tenth aspects, the object area may be configured to include a face area.

In a twelfth aspect, the image processing device according to any one of the first to eleventh aspects may be configured to include a stamp generation unit that generates a stamp on the basis of the object image.

An image processing system according to a thirteenth aspect of the present invention is an image processing system comprising a server device connected to a network, the server device including: an object area determination unit that determines an object area of a color image; a mask image generation unit that generates a mask image of the object area; an object image generation unit that extracts the object area and generates an object image on the basis of the object area; a color determination unit that determines a color to be subtracted from colors to be applied to the object area, and sets a smaller number of colors than those of the object area as colors of the object image; and a probability calculation unit that calculates a probability of pixels of the mask image being pixels of the object area, in which the object image generation unit sets the colors designated using the color determination unit as colors of an edge area of the object image on the basis of the probability.

According to the thirteenth aspect, it is possible to obtain the same effects as those in the first aspect.

In the thirteenth aspect, the same matters as the matters specified in the second to twelfth aspects can be combined appropriately. In this case, the component serving the process or function specified in the image processing device can be ascertained as a component of the image processing system serving the process or function corresponding thereto.

An image processing method according to a fourteenth aspect is an image processing method including: an object area determination step of determining an object area of a color image; a mask image generation step of generating a mask image of the object area; an object image generation step of extracting the object area and generating an object image on the basis of the object area; a color determination step of determining a color to be subtracted from colors to be applied to the object area, and setting a smaller number of colors than those of the object area as colors of the object image; and a probability calculation step of calculating a probability of pixels of the mask image being pixels of the object area, in which the object image generation step sets the colors set in the color determination step as colors of an edge area of the object image on the basis of the probability.

According to the fourteenth aspect, it is possible to obtain the same effects as those of the first aspect.

In the fourteenth aspect, the same matters as the matters specified in the second to twelfth aspects can be combined appropriately. In this case, the component serving the process or function specified in the image processing device can be ascertained as a component of the image processing system serving the process or function corresponding thereto.

A program according to a fifteenth aspect is a program causing a computer to realize: an object area determination function of determining an object area of a color image; a mask image generation function of generating a mask image of the object area; an object image generation function of extracting the object area and generating an object image on the basis of the object area; a color determination function of determining a color to be subtracted from colors to be applied to the object area, and setting a smaller number of colors than those of the object area as colors of the object image; and a probability calculation function of calculating a probability of pixels of the mask image being pixels of the object area, in which the object image generation function includes setting the colors set using the color determination function as colors of an edge area of the object image on the basis of the probability.

According to the fifteenth aspect, it is possible to obtain the same effects as those of the first aspect.

In the fifteenth aspect, the same matters as the matters specified in the second to twelfth aspects can be combined appropriately. In this case, the component serving the process or function specified in the image processing device can be ascertained as a component of the image processing system serving the process or function corresponding thereto.

According to the present invention, the color of the edge area of the object image corresponding to the boundary area of the mask image is set on the basis of the probability of being an object area, which has been set in the boundary area of the mask image. Accordingly, inclusion of colors of the background or the like into the object image can be suppressed.

DESCRIPTION OF THE PREFERRED EMBODIMENTS

Figure 1:
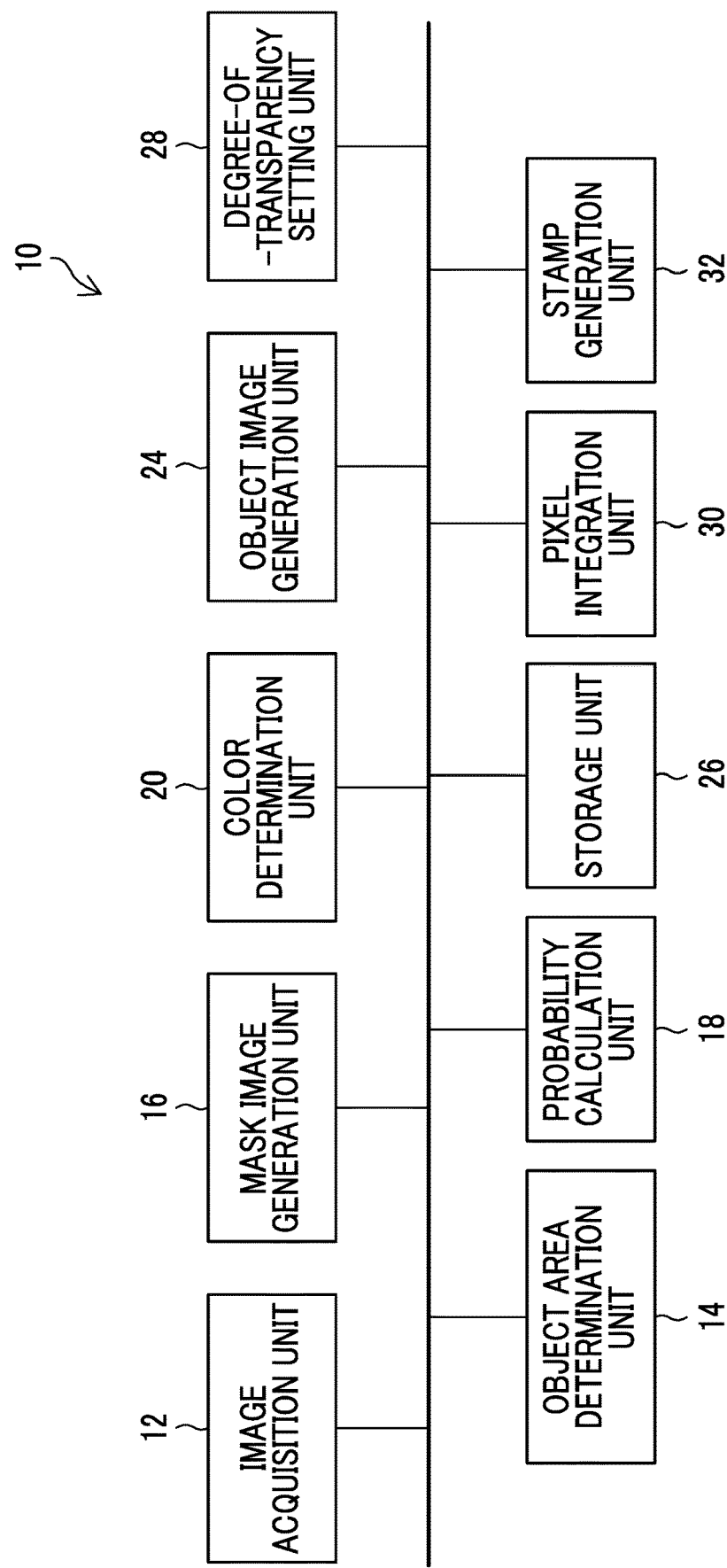
FIG. 1 is a functional block diagram of an image processing device.

Hereinafter, preferred embodiments of the present invention will be described in detail with reference to the attached drawings. In the present specification, the same components are denoted by the same reference numerals, and repeated description will be appropriately omitted.

Image Processing Device

Description of Function of Image Processing Device

FIG. 1 is a functional block diagram of an image processing device.

The image processing device 10 includes an image acquisition unit 12, an object area determination unit 14, a mask image generation unit 16, a probability calculation unit 18, a color determination unit 20, an object image generation unit 24, and a storage unit 26. The image processing device 10 further includes a degree-of-transparency setting unit 28, a pixel integration unit 30, and a stamp generation unit 32.

The image processing device 10 automatically determines an object area from a color image, extracts the object area, and generates an object image in which the number of colors is reduced as compared with the object. The image processing device 10 generates an illustrative stamp using the object image in which the number of colors has been reduced as compared with the object of the color image.

The image acquisition unit 12 acquires the color image. The image acquisition unit 12 stores the acquired image in the storage unit 26. The storage unit 26 illustrated in FIG. 1 is a generic term for a storage unit that stores various pieces of data and the like. For example, the storage unit 26 is configured using a plurality of storage devices for each type of data.

An example of the color image is a full color image in which each color of red, green and blue is represented by 8 bits and color information is represented by a value of 24 bits. In a case where a face of a person is extracted from a color image of the person and a stamp of the face of the person is generated, the image acquisition unit 12 acquires a color image in which the face of the person is captured near a center of the image.

In a case where a color image in which the face of the person is not captured near the center of the image is acquired, a position of the object area including the face of the person, and a size of the object area are determined from the color image. The face of the person illustrated in the embodiment is an example of a face area.

In the present specification, the term image may be used with a meaning of image data. That is, the image acquisition unit 12 acquires image data obtained by imaging using an imaging device.

Figure 2:
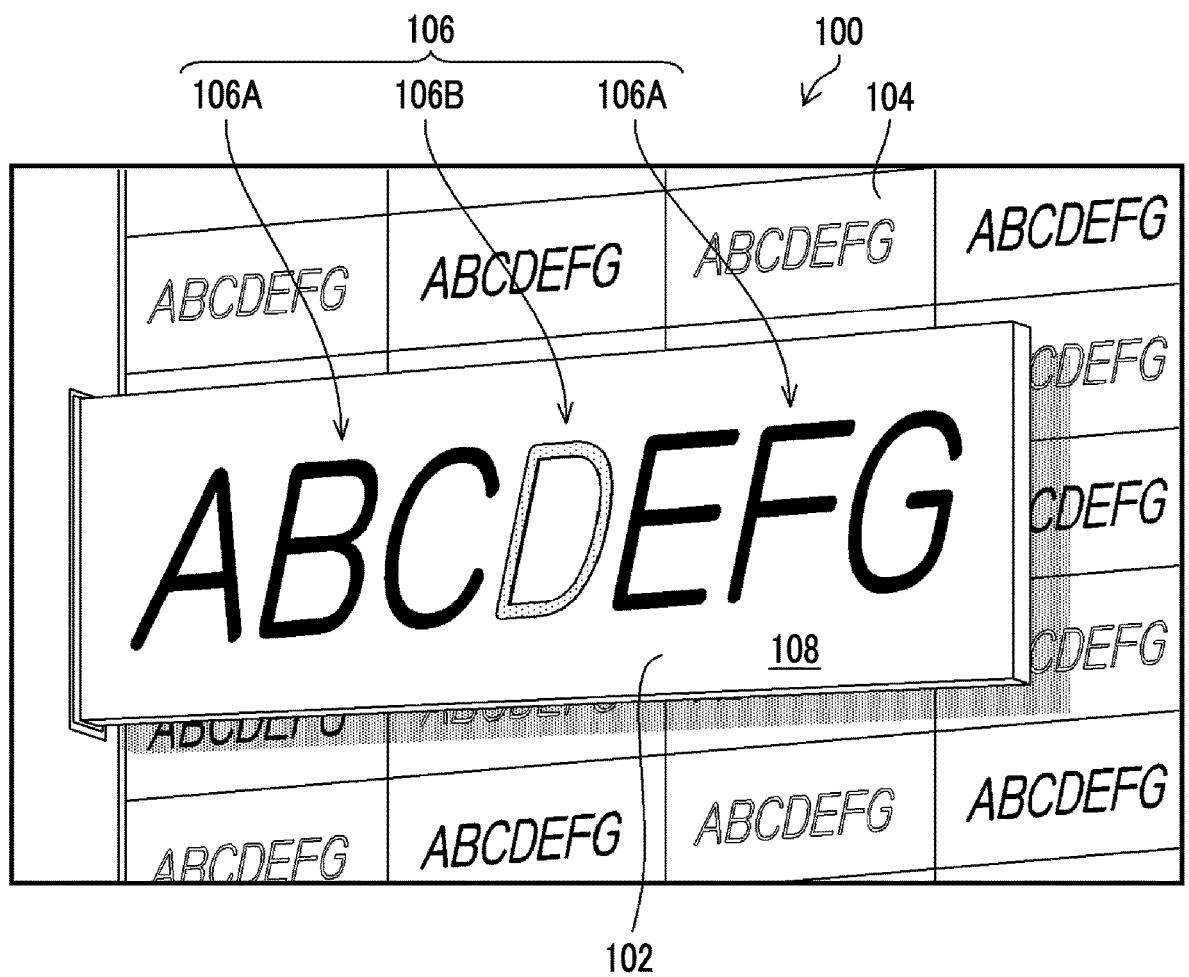
FIG. 2 is a diagram illustrating an example of an input image.

FIG. 2 is a diagram illustrating an example of an input image. An input image 100 illustrated in FIG. 2 has a signboard 102 captured as a main subject. Further, in the input image 100, a partition 104 is captured as a background. In the signboard 102, two colors different from a ground 108 are used for a letter 106. For example, green is used for the ground 108. White is used for the letter 106A. Red is used for the letter 106B.

The object area determination unit 14 automatically determines the signboard 102 illustrated in FIG. 2 as an object area of the input image 100. The object area determination unit 14 stores information on the object area in the storage unit 26.

For an automatic determination of the object area, schemes such as machine learning such as deep learning, and graph cutting can be used. An example of the deep learning is a convolutional neural network. The convolutional neural network may be referred to as a CNN using an abbreviation of the convolutional neural network in English.

The object area determination unit 14 to which the convolutional neural network is applied includes an input layer, an intermediate layer, and an output layer. The intermediate layer includes a plurality of sets consisting of a convolutional layer and a pooling layer, and a fully coupled layer. Each layer has a structure in which a plurality of nodes are connected using an edge.

The input image 100 is input to the input layer. The intermediate layer extracts a feature from the input image 100 input from the input layer. The convolutional layer performs filter processing on a nearby node close to a previous layer to acquire a feature map. The convolution layer performs convolution computation using a filter as filter processing.

In the pooling layer, the feature map output from the convolution layer is reduced and a new feature map is obtained. The convolutional layer serves as feature extraction such as edge extraction from the image data. The pooling layer serves to provide robustness so that the extracted feature is not affected by translation or the like.

For the intermediate layer, an aspect in which the convolutional layer is continuous and an aspect in which a normalization layer is included may be adopted. Further, a weight and a bias of a filter to be used in each convolutional layer are automatically learned using a large number of pieces of learning data in advance.

In a case where the user designates an object in the color image, the object area determination unit 14 may determine an object area including an object designated by the user in the color image.

For example, in a case where the face of the person is not located at a center of the color image, the user may specify the object in the color image by tapping a position of the face of the color image displayed on the display of the smartphone.

Figure 3:
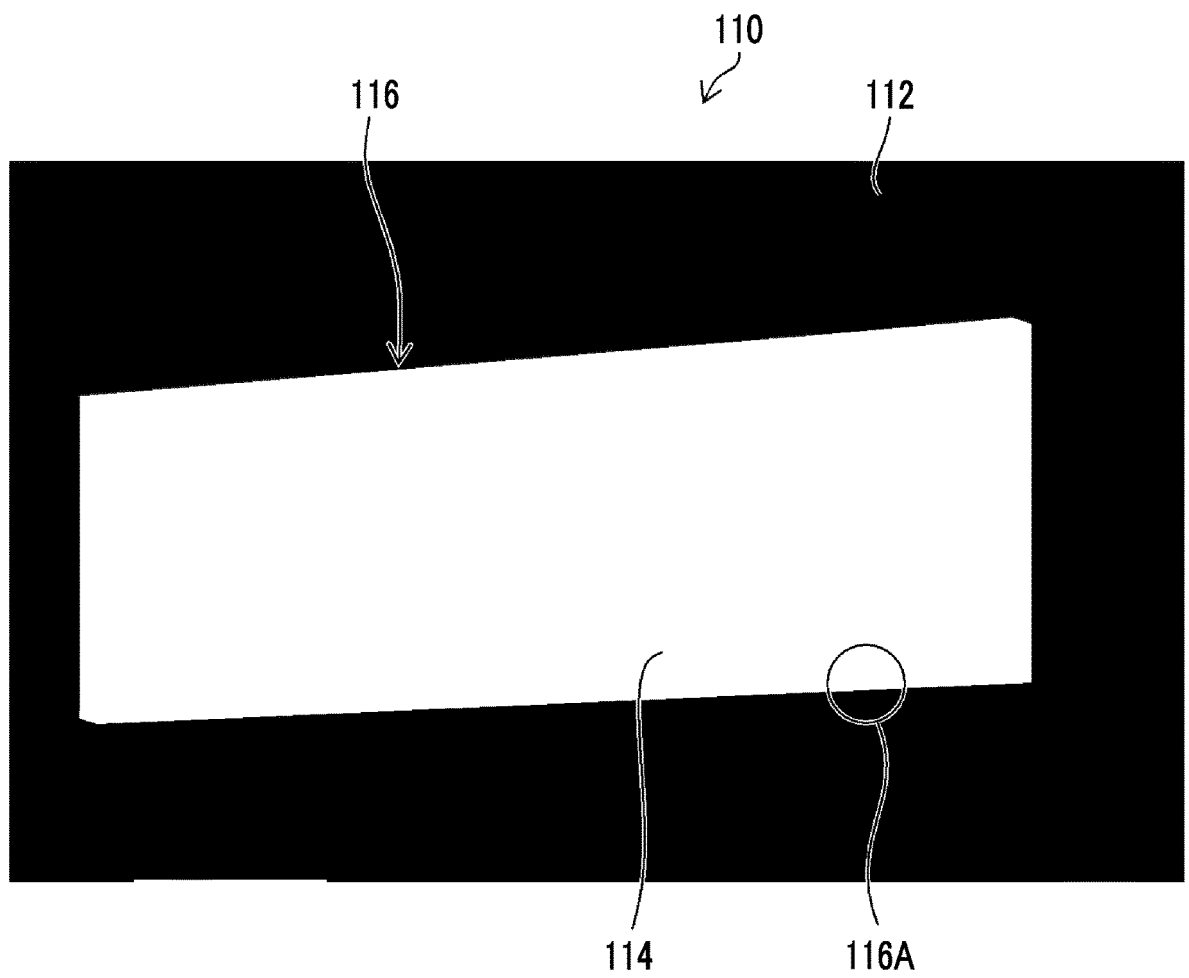
FIG. 3 is a diagram illustrating an example of a mask image.

The mask image generation unit 16 illustrated in FIG. 1 generates a mask image. The mask image generation unit 16 stores the mask image in the storage unit 26. FIG. 3 is a diagram illustrating an example of the mask image. The mask image 110 illustrated in FIG. 3 includes a mask area 112, a non-mask area 114, and a boundary area 116.

The mask area 112 is an area corresponding to an area other than the object area of the color image. The non-mask area 114 is an area corresponding to the object area of the color image. The boundary area 116 is an area including a boundary between the mask area 112 and the non-mask area 114. The boundary area 116 may have a width of one pixel or may have a width of two or more pixels.

Figure 4:
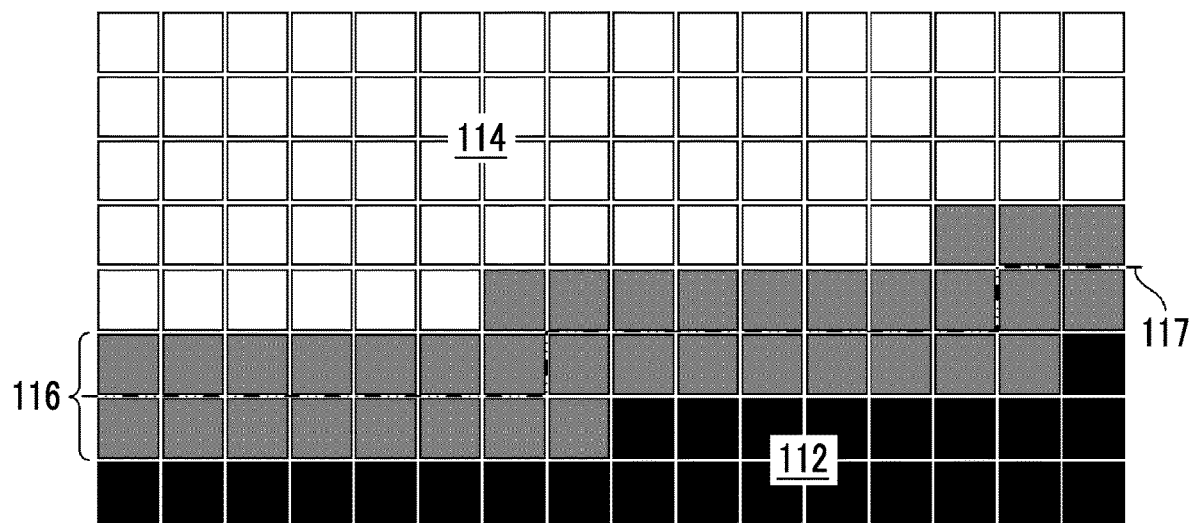
FIG. 4 is a partially enlarged diagram of a boundary between a mask area and a non-mask area in the mask image.

FIG. 4 is a partially enlarged diagram of a boundary between the mask area and the non-mask area in the mask image. FIG. 4 is an enlarged diagram of a portion denoted by reference numeral 116A in FIG. 3. Further, a black square illustrated in FIG. 4 is a pixel of the mask area 112. Further, a white square is a pixel of the non-mask area 114.

Reference numeral 117 indicates the boundary between the mask area 112 and the non-mask area 114. The boundary area 116 illustrated in FIG. 5 has a width of one pixel from the boundary 117 to the mask area 112 and a width of one pixel from the boundary 117 to the non-mask area 114.

The probability calculation unit 18 calculates a probability of each pixel in the boundary area 116 of the mask image 110 being an object area. The probability calculation unit 18 stores the probability of being the object area, which is set in the pixel in the boundary area 116 of the mask image 110, in the storage unit 26.

That is, a probability of being an object area, which is represented using a numerical value exceeding 0% and less than 100%, is set in the pixel in the boundary area 116 of the mask image 110.

The probability calculation unit 18 may calculate, as the probability of being an object area, a degree of reliability included in the object area for the pixels on a closed curve representing the boundary of the object area. The closed curve representing the boundary of the object area may have a width of one pixel or may have a width of two or more pixels.

A reciprocal of a squared error of a pixel value in a specific pixel on a closed curve representing an edge of the object area with respect to an average of the pixel values of the pixels in the object area is calculated. This value represents a degree of reliability of the specific pixel on the closed curve representing the edge of the object area being included in the object area.

In a case where the number of pixels on the closed curve is relatively increased, the accuracy of the probability of being an object area is improved. On the other hand, in a case where the number of pixels on the closed curve is relatively decreased, the amount of calculation of the probability of being an object area is relatively decreased.

In a case where the closed curve has any number of pixels from two pixels to ten pixels, a balance between the accuracy of the probability of being an object area and the amount of calculation of the probability of being an object area is good. The calculation of the probability of being an object area is not limited to the scheme, and another scheme may be applied.

Figure 5:
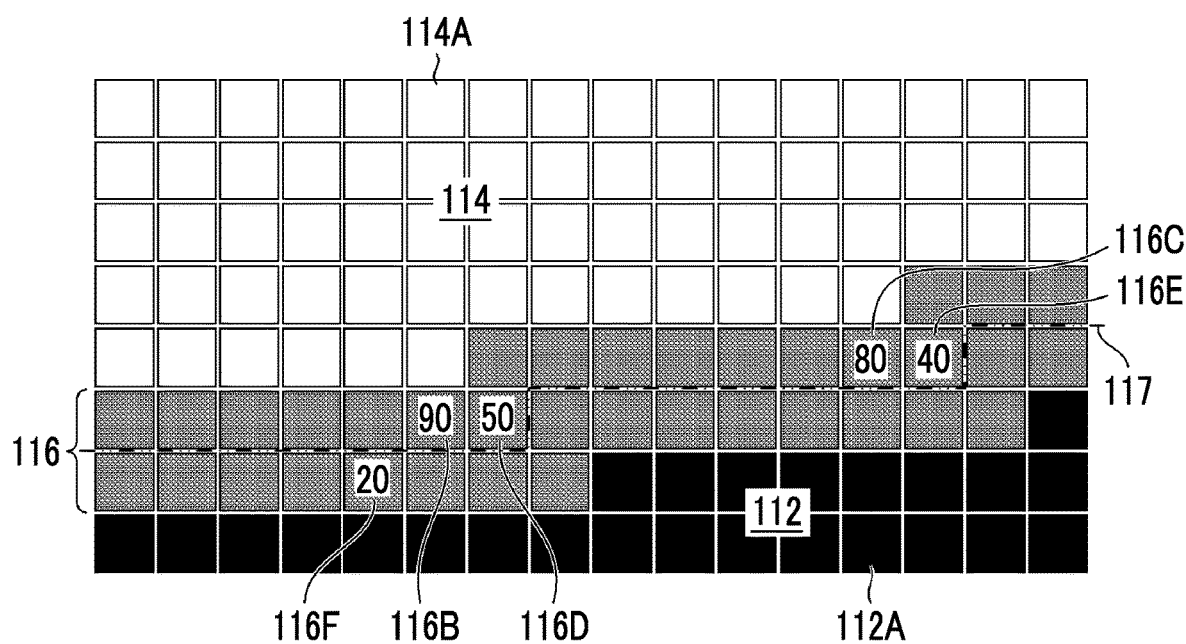
FIG. 5 is a diagram illustrating an example of pixels in a boundary area in which probability of being an object area has been set.

FIG. 5 is a diagram illustrating an example of pixels in the boundary area in which the probability of being an object area has been set. In a pixel 116B, the probability of being an object area is 90%. A numerical value assigned to each of a pixel 116C, a pixel 116D, and a pixel 116F represents the probability of being an object area of each pixel.

The pixel 112A is a pixel in the mask area 112. In the pixel in the mask area 112, probability of being an object area is 0%. Further, a pixel 114A is a pixel in the non-mask area 114. In the pixel 114A, the probability of being an object area is 100%.

The probability calculation unit 18 may calculate the probability of being an object area for all pixels of the mask image. The mask image generation unit 16 may set a pixel with the probability of 0% as the pixel in the mask area 112, set a pixel with the probability of 100% as a pixel in the non-mask area, and sets pixel with the probability exceeding 0% and less than 100% as a pixel in the boundary area.

The color determination unit 20 determines a color to be subtracted in number from colors applied to the object area. As an example of color reduction may include an example in which 1677 million colors, which are 24-bit full colors, are reduced to any number of colors from three colors to tens of colors.

For a color reduction number, a numerical value indicating validity can be calculated, and the color reduction number can be defined from the number of colors that do not cause a sense of color discomfort in an image in which the number of colors is reduced. For example, energy may be calculated as the numerical value indicating validity, and the color reduction number may be defined from the number of colors in which the energy is stable.

In a case where the stamp is generated using the object image, the stamp has an illustrative element. In the illustrative stamp, it is not necessary to apply full color and perform color representation, but it is possible to apply the number of colors in which certain quality of the stamp is maintained.

For example, in a color image that is an original image of the stamp, a similar color is represented in multi-gradation. On the other hand, it is convenient to use the similar color as a stamp in a case where the similar color is represented by one or several colors.

The color determination unit 20 may set a color to be applied to the object image from among the colors to be applied to the object area. The object image is generated by extracting the object area from the color image.

The color determination unit 20 may automatically determine the color to be subtracted from the object area. For example, the intermediate color may be determined as the color to be subtracted. The color determination unit 20 may determine a color designated in a color palette representing the color to be used for the object area to be a color to be applied to the object image. The color designated in the color palette illustrated in the embodiment is an example of the defined color.

The object image generation unit 24 generates an object image using the color image and the mask image. The object image generation unit 24 applies the color designated using the color determination unit 20 to each pixel of the object image. That is, the object image generation unit 24 reduces the color of the object area to generate an object image.

Figure 6:
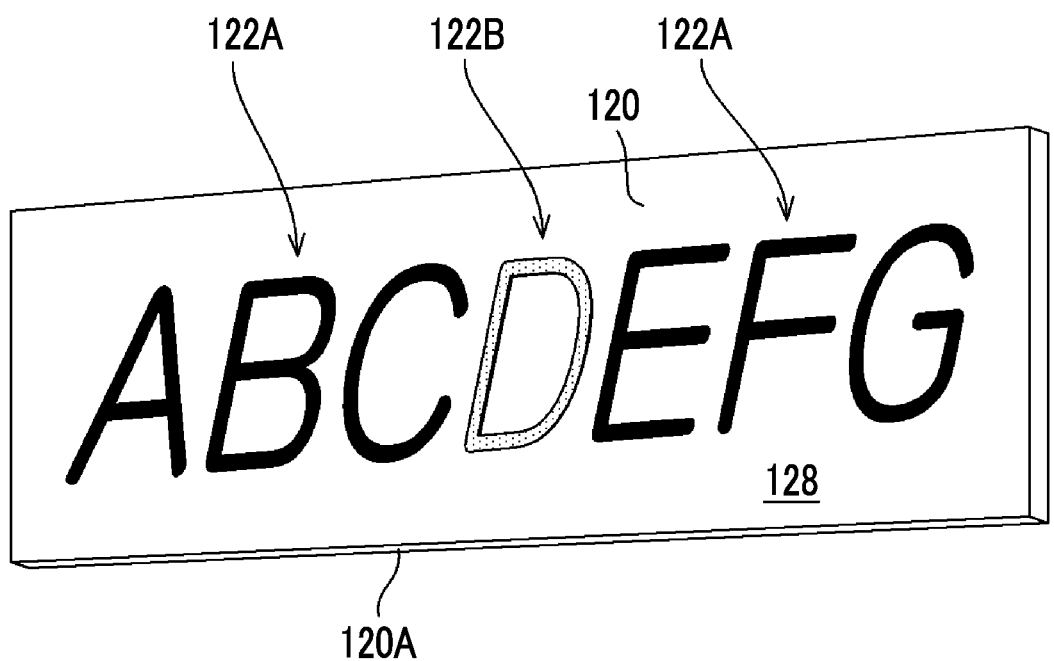
FIG. 6 is a diagram illustrating an example of an object image.

FIG. 6 is a diagram illustrating an example of the object image. An object image 120 illustrated in FIG. 6 is reduced in color as compared with the signboard 102 illustrated in FIG. 2. For example, for a letter 122A of the object image 120 corresponding to the letter 106A of the input image 100, black is applied to the letter 106A to which multi-gradation gray has been applied.

Similarly, for a letter 122B of the object image 120 corresponding to the letter 106B of the input image 100, one type of red is applied to a letter 106B to which multi-gradation red has been applied. Further, for a ground 128 of the object image 120 corresponding to the ground 108 of the input image 100, one type of green is applied to the ground 108 to which multi-gradation green has been applied.

Further, the pixel of the edge 120A of the object image 120 is determined in color on the basis of the probability of being an object area, which has been set in the boundary area 116 of the mask image 110. For example, in a case where the determination threshold is 50%, the color of the object image is applied to the pixel of which a probability of being an object area is 50% or more.

Accordingly, a setting of colors other than the object area as the color of the object image can be suppressed, and unnaturalness of the color of the object image can be suppressed. 50% of the determination threshold is an example, and any determination threshold may be defined according to generation conditions of the object image such as image quality of the object image and the color to be subtracted.

The degree-of-transparency setting unit 28 sets a degree of transparency in the pixels in the edge area of the object image 120 according to the probability of being an object area, which is applied to the boundary area 116 of the mask image 110. The edge area is an area having a width of at least one pixel including the edge 120A of the object image 120.

For example, in a pixel having a relatively high probability of being an object area, the degree of transparency is made relatively low such that a degree at which the background is transmitted onto the object area is decreased. On the other hand, in a pixel having a relatively low probability of being an object area, the degree of transparency is made relatively high such that the degree at which the background is transmitted onto the object area is increased. That is, the degree of transparency is represented as the degree at which the background is transmitted onto the object area. For example, in a case where the degree of transparency is 0%, the background is not transmitted onto the object area at all. On the other hand, in a case where the degree of transparency is 100%, the background is completely transmitted to the object area.

The pixel integration unit 30 integrates the pixels of which the degree of transparency has been set using the degree-of-transparency setting unit 28 into the object image 120. The pixel integration unit 30 stores, in the storage unit 26, the object image into which the pixels of which the degree of transparency has been set are integrated.

The pixels of which the degree of transparency has been set are integrated near the edge 120A and the edge 120A of the object image 120. Accordingly, generation of jaggies at the edge 120A of the object image 120 can be suppressed by blurring the vicinity of the edge 120A and the edge 120A of the object image 120.

The stamp generation unit 32 generates a stamp from the object image generated using the object image generation unit 24. The stamp generation unit 32 stores the generated stamp in the storage unit 26.

Since the stamp is reduced in color as compared with the object area of the color image, the illustrative stamp can be generated. Further, in the object image 120 that is a basis of the stamp, color unnaturalness at the edge 120A is suppressed, and the occurrence of jaggies is suppressed. Accordingly, a stamp in which the color unnaturalness has been suppressed and the occurrence of the jaggies has been suppressed can be generated.

Description of Hardware Configuration of Image Processing Device

Figure 7:
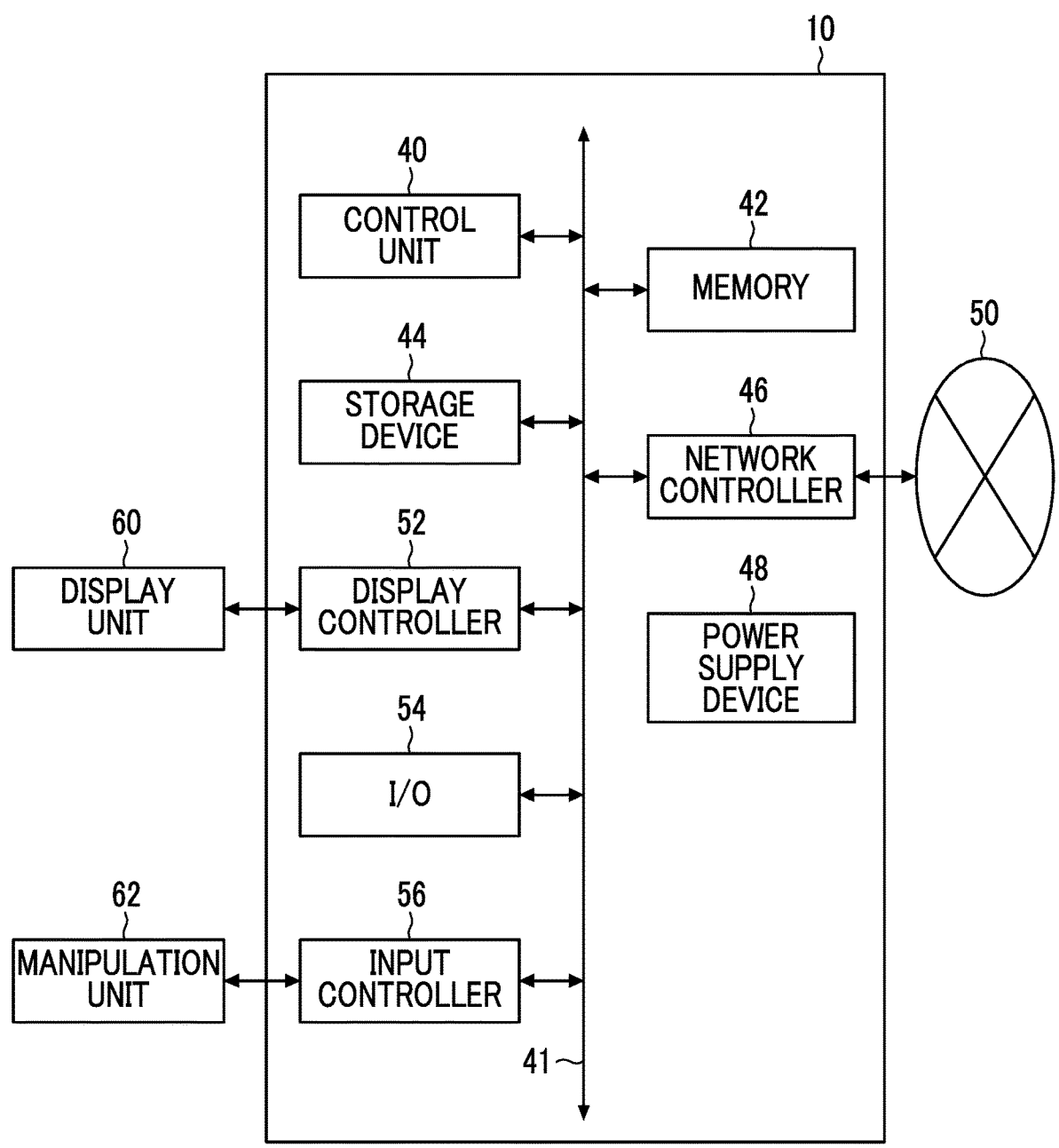
FIG. 7 is a block diagram illustrating a hardware configuration of the image processing device.

FIG. 7 is a block diagram illustrating a hardware configuration of the image processing device.

Overall Configuration

The image processing device 10 illustrated in FIG. 1 includes a control unit 40, a memory 42, a storage device 44, a network controller 46, and a power supply device 48. The control unit 40, the memory 42, the storage device 44, and the network controller 46 are communicatively connected via the bus 41.

The image processing device 10 may include a display controller 52, an input and output interface 54, and an input controller 56. The image processing device 10 can execute a defined program using the control unit 40 to realize various functions of the image processing device 10.

Control Unit

The control unit 40 functions as an entire control unit, various computation units, and a storage control unit of the image processing device 10. The control unit 40 executes a program stored in a read only memory (ROM) included in the memory 42.

The control unit 40 may download a program from an external storage device via the network controller 46 and execute the downloaded program. The external storage device may be communicatively connected to the image processing device 10 via the network 50.

The control unit 40 uses a random access memory (RAM) included in the memory 42 as a computation area, and executes various processes in cooperation with various programs. Accordingly, various functions of the image processing device 10 are realized.

The control unit 40 controls reading of data from the storage device 44 and writing of data to the storage device 44. The control unit 40 may acquire various pieces of data from the external storage device via the network controller 46. The control unit 40 can execute various processes such as computation using the acquired various pieces of data.

The control unit 40 may include one or more processors. Examples of the processor include a field programmable gate array (FPGA) and a programmable logic device (PLD). The FPGA and the PLD are devices of which a circuit configuration can be changed after manufacture.

Another example of the processor may include an application specific integrated circuit (ASIC). The ASIC includes a circuit configuration that is specifically designed to perform a specific process.

For the control unit 40, two or more processors of the same type can be applied. For example, for the control unit 40, two or more FPGAs may be used or two PLDs may be used. For the control unit 40, two or more processors of different types can be applied. For example, for the control unit 40, one or more FPGAs and one or more ASICs can be applied.

In a case where a plurality of control units 40 are included, the plurality of control units 40 may be configured using one processor. An example in which the plurality of control units 40 are configured using one processor includes an aspect in which one processor is configured using a combination of one or more central processing units (CPUs) and software, and this processor functions as the plurality of control units 40. The software in the present specification is synonymous with a program.

A graphics processing unit (GPU) that is a processor specialized for image processing may be applied instead of the CPU or in combination with the CPU. A representative example in which the plurality of control units 40 are configured using one processor may include a computer.

Another example in which the plurality of control units 40 are configured using one processor may include an aspect in which a processor that realizes functions of the entire system including the plurality of control units 40 using one IC chip is used. A representative example of a processor that realizes the functions of the entire system including the plurality of control units 40 using one IC chip may include a system on chip (SoC). The IC is an abbreviation of integrated circuit.

Thus, the control unit 40 is configured using one or more of various processors as a hardware structure.

Memory

The memory 42 includes a ROM (not illustrated) and a RAM (not illustrated). The ROM stores various programs that are executed by the image processing device 10. The ROM stores parameters, files, and the like that is used for execution of various programs. The RAM functions as a temporary storage area for data, a work area for the control unit 40, and the like.

Storage Device

The storage device 44 stores various pieces of data non-temporarily. The storage device 44 may be externally attached to the image processing device 10. A large capacity semiconductor memory device may be applied instead of or in combination with the storage device 44.

Network Controller

The network controller 46 controls data communication with an external device. Control of the data communication may include management of data communication traffic. For the network 50 connected via the network controller 46, a known network such as a local area network (LAN) can be applied.

Power Supply Device

As the power supply device 48, a large capacity power supply device such as an uninterruptible power supply (UPS) is applied. The power supply device 48 supplies power to the image processing device 10 in a case where a commercial power is shut off due to a power failure or the like.

Display Controller

The display controller 52 functions as a display driver that controls the display unit 60 on the basis of a command signal transmitted from the control unit 40.

Input and output Interface

The input and output interface 54 communicatively connects the image processing device 10 to an external device. The input and output interface 54 can apply a communication standard such as a universal serial bus (USB).

Input Controller

The input controller 56 converts a format of the signal input using the manipulation unit 62 into a format suitable for the process of the image processing device 10. Information input from the manipulation unit 62 via the input controller 56 is transmitted to each unit via the control unit 40.

A hardware configuration of the image processing device 10 illustrated in FIG. 7 is an example, and addition, deletion, and change can be made appropriately.

Flowchart of Image Processing Method

Figure 8:
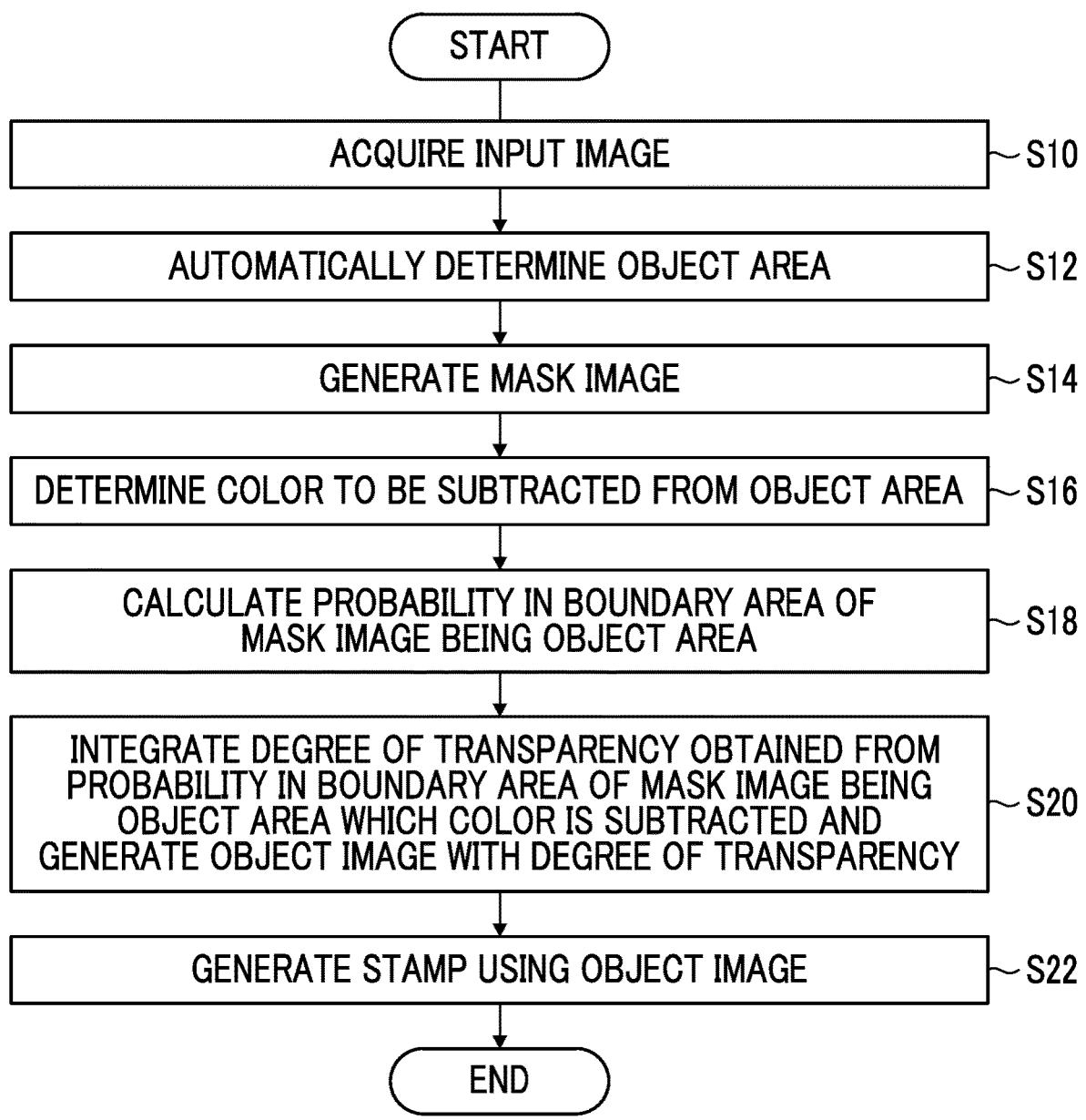
FIG. 8 is a flowchart illustrating a procedure of an image processing method.

FIG. 8 is a flowchart illustrating a procedure of the image processing method. The image processing method of which the procedure is illustrated in FIG. 8 includes an input image acquisition step S10, an object area determination step S12, a mask image generation step S14, a color determination step S16, a probability calculation step S18, an object image generation step S20, and a stamp generation step S22.

In the input image acquisition step S10, the image acquisition unit 12 illustrated in FIG. 1 acquires the input image 100 illustrated in FIG. 2 as a color image. After the input image acquisition step S10, an input image storage step of storing the input image 100 may be performed. After the input image acquisition step S10, the process proceeds to the object area determination step S12.

In the object area determination step S12, the object area determination unit 14 automatically determines an object area from the input image 100. After the object area determination step S12, an object information storage step of storing information on the object area may be performed. After the object area determination step S12, the process proceeds to the mask image generation step S14.

In the mask image generation step S14, the mask image generation unit 16 generates the mask image 110 illustrated in FIG. 3. After the mask image generation step S14, a mask image storage step of storing the mask image 110 may be performed. After the mask image generation step S14, the process proceeds to the color determination step S16.

In the color determination step S16, the color determination unit 20 determines the color to be subtracted, from the colors applied to the signboard 102 illustrated in FIG. 2, which is an object. For example, an intermediate color to be applied to the ground of the signboard 102 and an intermediate color to be applied to a letter may be determined to be the colors to be subtracted. After the color determination step S16, the process proceeds to the probability calculation step S18.

In the probability calculation step S18, the probability calculation unit 18 calculates the probability of the pixel in the boundary area 116 of the mask image 110 being an object area, as illustrated in FIG. 5. After the probability calculation step S18, the process proceeds to the object image generation step S20.

In the object image generation step S20, the object image generation unit 24 generates the object image 120 illustrated in FIG. 6. The object image generation step S20 includes a color reduction processing step of reducing the color to be applied to the object area on the basis of the color to be subtracted, which has been determined in the color determination step S16.

The object image generation step S20 may include a degree-of-transparency setting step of setting a degree of transparency in the pixels in the edge area of the object image according to the probability of being an object area, which has been set in the pixel in the boundary area 116 of the mask image 110.

Further, the object image generation step S20 may include a pixel integration step of integrating pixels, of which the degree of transparency has been set in the degree-of-transparency setting step, into an object image. After the object image generation step S20, the process proceeds to the stamp generation step S22.

In the stamp generation step S22, the stamp generation unit 32 generates a stamp on the basis of the object image. After the stamp generation step S22, a stamp storage step of storing a stamp may be performed. Further, after the stamp generation step S22, a stamp output step of outputting a stamp may be performed. An example of the stamp output may include a display of a stamp using a display of a smartphone that is used by the user.

Although the image processing method including the stamp generation step S22 has been described in the embodiment, the stamp generation step S22 may be changed to a generation step other than the stamp generation using the object image. For example, an ornament generation step of generating an ornament using the object image may be applied instead of the stamp generation step S22.

Operation and Effects

With the image processing device and the image processing method configured as described above, it is possible to obtain the following operation and effects.

[1] The colors of the object image generated using the object area extracted from the color image are reduced in number as compared with the colors to be applied to the object area. The pixels at the edge of the object image have colors to be applied to the object image, on the basis of the probability of being an object area in the color image. Accordingly, inclusion of colors other than the colors to be applied to the object image into the object image is suppressed, and unnaturalness of the colors in the object image can be suppressed.

[2] In the edge area of the object image, the degree of transparency set on the basis of the probability of being an object area in the color image is integrated. Accordingly, the edge area of the object image has an appropriate degree of transparency, and an object image in which jaggies or the like has been suppressed can be generated.

[3] An object area is automatically extracted from the color image. For the automatic extraction of the object area, deep learning is applied. Accordingly, it is possible to increase the accuracy of object area extraction.

Application Example

An intermediate color between respective colors may be applied to the pixel at the color boundary in the object image 120 illustrated in FIG. 6 using a probability of being each color. For example, in the object image 120, a probability of being a letter is calculated for the pixels in the edge area of the letter that is the boundary area between the color of the letter and the color of the background. To calculate the probability of being a letter, a scheme of calculating the probability of being an object area in the color image can be applied. An error diffusion method may be applied in a case where colors to be applied to the object area are reduced in number.

The intermediate color may be a single gradation or multi-gradation. A width of the boundary area of the color may be one pixel or may be two or more pixels. The pixels in the edge area of the letter illustrated in the embodiment are examples of pixels with adjacent different color.

Operation and Effects of Application Example

According to the image processing device and the image processing method of the application example, an intermediate color based on a probability of being one color is applied to the pixels in the boundary area of the colors in the object image. Accordingly, it is possible to suppress the occurrence of unnaturalness between the colors of the object image 120.

Application to Network System

For the image processing device 10 illustrated in FIG. 1, a desktop type computer can be applied. For the image processing device 10, a portable information processing terminal such as a smartphone, a tablet computer, and a notebook computer may be applied.

Figure 9:
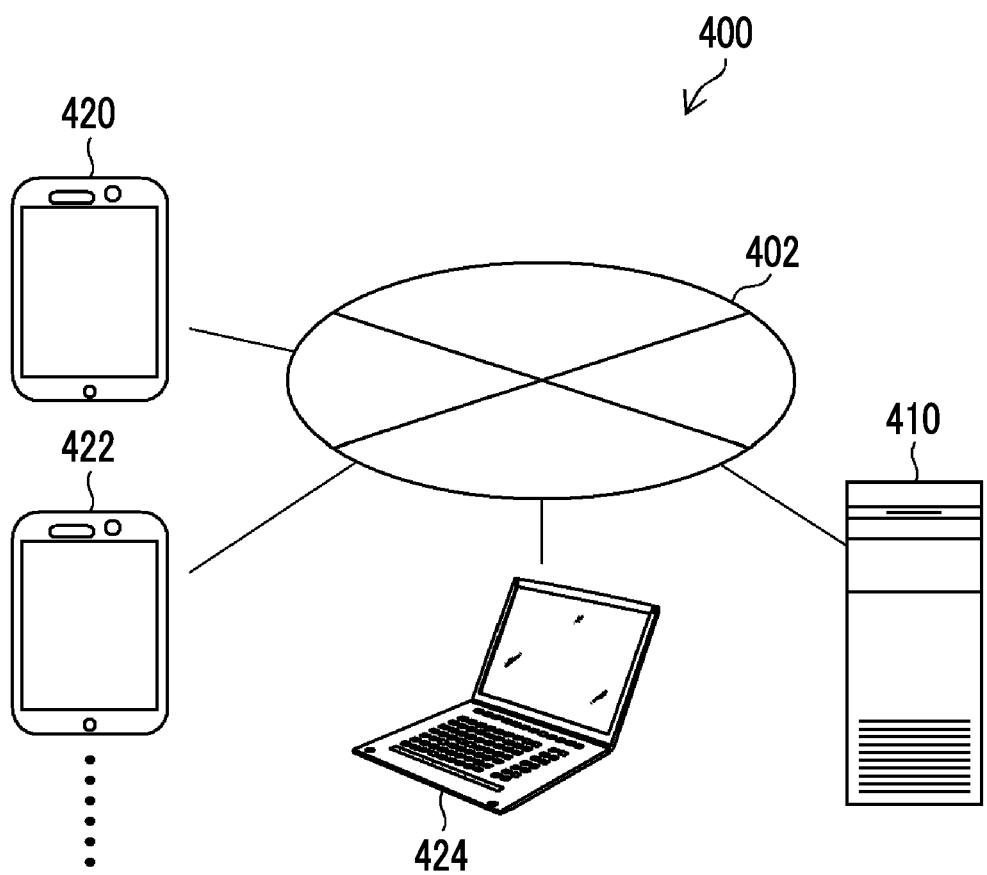
FIG. 9 is a block diagram of an image processing system according to an example of application to a network system.

FIG. 9 is a block diagram of an image processing system according to an example of application to a network system. An image processing system 400 illustrated in FIG. 9 includes a server device 410. The server device 410, the first user terminal 420, the second user terminal 422, and the third user terminal 424 are communicatively connected via the network 402. The image processing system 400 may include a mass storage device such as a storage device communicatively connected via the network 402.

For the network 402, a wide area communication network such as wide area network (WAN) may be applied, or a local area communication network such as local area network (LAN) may be applied. A communication scheme, communication protocol, and the like of the network 402 are not limited. For the network 50 illustrated in FIG. 7, the network 402 illustrated in FIG. 9 can be applied.

For the server device 410, the image processing device 10 described with reference to FIGS. 1 to 8 is applied. In the aspect illustrated in FIG. 9, the display controller 52, the input and output interface 54, the input controller 56, the display unit 60, and the manipulation unit 62 illustrated in FIG. 2 may be omitted.

In the server device 410 illustrated in FIG. 9, the storage device 44 illustrated in FIG. 2 may be communicatively connected to the server device 410 via the network 402. FIG. 9 illustrates an example in which a portable terminal is applied as the first user terminal 420 and the second user terminal 422, and a laptop computer is applied as the third user terminal 424. A user terminal such as the first user terminal 420 may be a device that is communicatively connected to the server device 410 via the network 402.

Example of Application to Program

The image processing device 10 and the image processing method described above can be configured as a program causing a function corresponding to each unit in the image processing device 10 or a function corresponding to each step in the image processing method to be executed using a computer.

Examples of functions corresponding to the respective steps include an input image acquisition function, an object area determination function, a mask image generation function, a color determination function, a probability calculation function, an object image generation function, a degree-of-transparency setting function, and a pixel integration function.

The input image acquisition function corresponds to the image acquisition unit 12 illustrated in FIG. 1. The object area determination function corresponds to the object area determination unit 14. The mask image generation function corresponds to the mask image generation unit 16.

The probability calculation function corresponds to the probability calculation unit 18. The color determination step corresponds to the color determination unit 20. The object image generation function corresponds to the object image generation unit 24. The storage step corresponds to the storage unit 26. The degree-of-transparency setting function corresponds to the degree-of-transparency setting unit 28. The pixel integration function corresponds to the stamp generation unit 30. The stamp generation function corresponds to the stamp generation unit 32.

It is possible to store the program causing the computer to realize the information processing function described above in a computer-readable information storage medium, which is a tangible non-temporary information storage medium, and provide the program through the information storage medium. Further, an aspect in which a program signal is provided via a network is also possible, instead of the aspect in which the program is stored in the non-temporary information storage medium and provided.

Combination of Embodiment and Modification Example

The components described in the above-described embodiment and the components described in the application example or the like can be used in appropriate combination, and some of the components can be replaced.

In the embodiment of the present invention described above, it is possible to appropriately change, add, or delete constituent requirements without departing from the spirit of the present invention. The present invention is not limited to the embodiments described above, and many modifications can be made by those skilled in the art within the technical spirit of the present invention.

EXPLANATION OF REFERENCES

10: image processing device
12: image acquisition unit
14: object area determination unit
16: mask image generation unit
18: probability calculation unit
20: color determination unit
24: object image generation unit
26: storage unit
28: degree-of-transparency setting unit
30: pixel integration unit
32: stamp generation unit
40: control unit
41: bus
42: memory
44: storage device
46: network controller
48: power supply device
50: network
52 display controller
54: input and output interface
56: input controller
60: display unit
62: manipulation unit
100: input image
102: signboard
104: partition
106: letter
106A: letter
106B: letter
108: ground
110: mask image
112: mask area
114: non-mask area
114A: pixel
116: boundary area
116A: pixel
116B: pixel
116C: pixel
116D: pixel
116E: pixel
116F: pixel
117: boundary
120: object image
120A: edge
122A: letter
122B: letter
128: ground
400: image processing system
402: network
410: server device
420: first user terminal
422: second user terminal
424: third user terminal
S10 to S22: Respective steps of image processing method

What is claimed is:

1. An image processing device comprising:
an object area determination unit that determines an object area of a color image;
a mask image generation unit that generates a mask image of the object area;
an object image generation unit that extracts the object area and generates an object image on the basis of the object area;
a color determination unit that determines a color to be subtracted from colors to be applied to the object area, and sets a smaller number of colors than those of the object area as colors of the object image; and
a probability calculation unit that calculates a probability of pixels of the mask image being pixels of the object area,
wherein the object image generation unit sets the colors set using the color determination unit as colors of an edge area of the object image on the basis of the probability.

2. The image processing device according to claim 1, wherein the probability calculation unit calculates the probability of a pixel in a boundary area in the mask image being the object area.

3. The image processing device according to claim 1, comprising:
a degree-of-transparency setting unit that sets a degree of transparency of the edge area of the object area on the basis of the probability; and
a pixel integration unit that integrates pixels to which the degree of transparency has been applied into the object image.

4. The image processing device according to claim 1, wherein the color determination unit sets a color to be applied to the object image from colors to be applied to the object area.

5. The image processing device according to claim 1, wherein the color determination unit sets a color to be applied to the object image from predetermined defined colors.

6. The image processing device according to claim 5, wherein the color determination unit sets a color designated by a user from the defined colors as the color to be applied to the object image.

7. The image processing device according to claim 1, wherein the color determination unit determines the color to be subtracted from the colors applied to the object area, using machine learning.

8. The image processing device according to claim 1, wherein, in a case where pixels of different colors are adjacent to each other in the object area, the object image generation unit sets an intermediate color between the different colors in the adjacent pixels of different colors.

9. The image processing device according to claim 1, wherein the object area determination unit determines the object area on the basis of an area designated by a user.

10. The image processing device according to claim 1, wherein the object area determination unit determines the object area using machine learning.

11. The image processing device according to claim 1, wherein the object area includes a face area.

12. The image processing device according to claim 1, further comprising:
a stamp generation unit that generates a stamp on the basis of the object image.

13. An image processing system comprising a server device connected to a network, the server device comprising:
an object area determination unit that determines an object area of a color image;
a mask image generation unit that generates a mask image of the object area;
an object image generation unit that extracts the object area and generates an object image on the basis of the object area;
a color determination unit that determines a color to be subtracted from colors to be applied to the object area, and sets a smaller number of colors than those of the object area as colors of the object image; and
a probability calculation unit that calculates a probability of pixels of the mask image being pixels of the object area,
wherein the object image generation unit sets the colors set using the color determination unit as colors of an edge area of the object image on the basis of the probability.

14. An image processing method comprising:
an object area determination step of determining an object area of a color image;
a mask image generation step of generating a mask image of the object area;
an object image generation step of extracting the object area and generating an object image on the basis of the object area;
a color determination step of determining a color to be subtracted from colors to be applied to the object area, and setting a smaller number of colors than those of the object area as colors of the object image; and
a probability calculation step of calculating a probability of pixels of the mask image being pixels of the object area,
wherein the object image generation step sets the colors set in the color determination step as colors of an edge area of the object image on the basis of the probability.

15. A non-transitory, computer-readable tangible recording medium which records a program causing a computer to realize:
an object area determination function of determining an object area of a color image;
a mask image generation function of generating a mask image of the object area;
an object image generation function of extracting the object area and generating an object image on the basis of the object area;
a color determination function of determining a color to be subtracted from colors to be applied to the object area, and setting a smaller number of colors than those of the object area as colors of the object image; and
a probability calculation function of calculating a probability of pixels of the mask image being pixels of the object area,
wherein the object image generation function includes setting the colors set using the color determination function as colors of an edge area of the object image on the basis of the probability.

* * * * *